Aug. 3, 1965        M. VON ARDENNE        3,198,060
DISPLAY DEVICE FOR SPACED APART PARTIAL IMAGES
Filed March 2, 1962
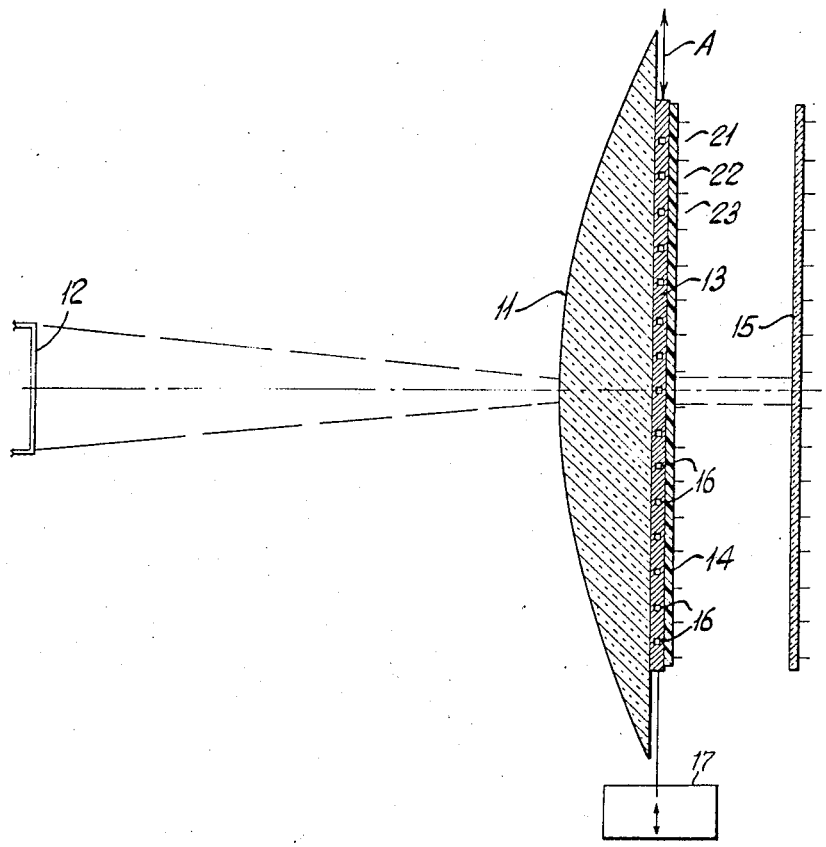
INVENTOR
MANFRED V. ARDENNE

United States Patent Office 3,198,060
Patented Aug. 3, 1965

3,198,060
DISPLAY DEVICE FOR SPACED APART
PARTIAL IMAGES
Manfred von Ardenne, Dresden-Weisser Hirsch, Germany, assignor to VEB Transformatoren- und Röntenwerk, Dresden, Overbeckstrasse, Germany
Filed Mar. 2, 1962, Ser. No. 177,064
1 Claim. (Cl. 88—1)

The present invention relates to an apparatus for the evaluation of diagnostic information obtained by the echo method and particularly by probing successive layers of the tissue to be studied by an ultrasonic beam.

The information contained in the echo images to be evaluated may be recorded and stored on a photographic film, on a xerographic plate or on a storage tube. Each recording contains information from a plurality, for instance 100, sectional images which were obtained by a point-by-point scanning of a line along the layer of a medium to be diagnosed. The information may have been obtained by an ultrasonic system.

Several methods for ultrasonic recording are known. These methods are based on two principles.

According to the pulse-echo method, the received echoes are converted into electric pulses which are applied to the Y-axis deflection plates of a cathode-ray tube. If simultaneously the electron beam is deflected in the direction of the X-axis as a function of the time which has elapsed between the transmission of a pulse and the return of an echo, a curve is traced on the screen, the amplitude of which is a measure of the intensity of the echo pulses, and thus a relative indication of the coefficient of reflection in the tissue; the position along the X-axis is indicative of the depth of the reflecting spot in the investigated medium. However, this method does not lend itself to area scanning and to a simple and convenient representation of the results in one plane.

Therefore, the scanning method uses the X- and Y-axes of the fluorescent screen for the representation of the investigated area, and the variations in the intensity of the reflected ultrasonic beam modulate the cathode-ray beam intensity and thus cause variations in the light emitted by the fluorescent screen. Thus, an echo summing is obtained since all reflections occurring along the path of the scanning beam are superposed. It is, therefore, impossible to draw any conclusions as to the depth from which the reflections have been obtained. Further, one strongly reflecting object cannot be distinguished from several less strongly reflecting objects.

To obviate these disadvantages, it has been proposed to record only those echoes which originate from a particular layer at a predetermined depth.

This may be accomplished by gating the amplifier, which receives the electrical pulses due to the ultrasonic echoes, for a predetermined time interval corresponding to the time required for the ultrasonic pulses to travel to the predetermined depth and to return.

According to another known principle, a diaphragm with a small aperture is positioned at the focal point of an oscillator. A convergence lens, positioned at a certain distance therefrom, images the aperture onto a desired region of the tissue. This device receives echoes from a comparatively thin layer only.

However, experiments have shown that with this device echoes originating in planes about 8 mm. before and 8 mm. behind the plane under investigation are still comparatively strong. Hence, if the scanning method is used, an echo summing image is obtained.

According to a further proposal, explained in my copending patent application entitled Apparatus and Method for Ultrasonic Diagnosis, Ser. No. 177,063, filed March 2, 1962, the information contents of the echo images is further increased by separating and photographically recording the echoes originating in this layer. Thus, as a line of the area to be diagnosed is scanned point-by-point, a sectional view, for instance 10 mm. high, is obtained. The height contains echo signals received from different depths of the examined layer.

The total echo image contains a plurality, for instance 100, sectional views. Each sectional view corresponds to a line of the scanned layer, while the height of the sectional view corresponds to the thickness of the layer to be diagnosed. To eliminate the reception of echoes from depths which are of no interest, it has been proposed to use a rectangular mask in front of the cathode-ray tube, which corresponds in height to the thickness of the section to be examined.

It is an object of the present invention to provide an apparatus for the evaluation of such echo records.

It is a further object of the present invention to provide an apparatus for the evaluation of echo records obtained with the equipment described in my above-mentioned copending application filed of even date herewith, Ser. No. 177,063, and entitled Apparatus and Method for Ultrasonic Diagnosis.

It is a still further object of the present invention to provide an apparatus for the display of echo records containing a recorded sequence of information, which apparatus selectively changes the sequence of information on display.

According to the present invention, the echo images originating within a predetermined thin layer, for instance of 1.5 mm. thickness, are selectively displayed from a record containing information of a much thicker layer. For this purpose, the sections of the original record corresponding to the predetermined layer are assembled into an echo image consisting of a plurality of lines.

The apparatus according to the present invention uses a collector lens which is illuminated by a linear light source of suitable width and length and positioned in the focal plane of the lens. On the side of the collector lens facing away from the light source, the film containing all available information is mounted together with a diaphragm. The diaphragm comprises a plurality of parallel slots, spaced a distance equal to the distance between successive sectional views on the film, corresponding to successive lines of the scanned tissue; the slots extend parallel to these sectional views, and may have a height of for instance ½ of the height of one sectional view. The image is displayed on a frosted glass or an opaline glass located at a suitable distance.

Further objects and advantages will become apparent from the following specification and taken in conjunction with the sole figure of this application in which there is given a schematic representation of the invention apparatus.

Reference is now made to the drawing, in which a spherical collector lens 11 converts the light beam emitted by each point of an elongated light source 12, having a predetermined length, into a parallel light beam. A diaphragm 13 is arranged along the side of the lens 11 which faces away from light source 12. A frosted glass 15, constituting translucent screen means, is spaced from diaphragm 13. Diaphragm 13 contains a plurality of aperture slots 16 to be explained further somewhat later in the specification.

A film 14 to be evaluated is arranged adjacent diaphragm 13. This film 14 contains all available information from, for instance 150 mm. by 150 mm., and from a certain layer, for instance 10 mm. thick, and located at a certain depth within the tissue. The information consists of a plurality of sectional views, such as 21, 22 and 23. Each sectional view 21, 22 and 23 records the information along one line of the investigated layer. Echoes received from different planes or depths of the layer to be diagnosed are separated on the film so that echoes originating from deeper regions of the layer correspond to images situated lower within the sectional view than echoes originating from higher regions.

Aperture slots 16 of diaphragm 13 extend parallel to the sectional views, may be of a height equal to about ¼ of that of these views, and are spaced by the distance between corresponding thickness of adjacent sectional views.

The diaphragm is adjustable in the direction indicated by the arrow A, by conventional means schematically indicated at 17.

In operation, film 14 is mounted in the display device and the diaphragm adjusted to a desired position corresponding to a specified depth within the layer under investigation. The light source 12 is energized. Each aperture 16 of the diaphragm 13 is aligned with a layer of the specified depth of the associated sectional view. Thus, the plurality of apertures 16 selects the images of narrow, equal-depth layers, one from each sectional view. These images are simultaneously and adjacently displayed on the frosted glass 15 by the light passing through lens 11, apertures 16 and film 14.

If the length of the light source 12 is correctly dimensioned, an image appears on the frosted glass or opaline glass 15 composed of separate image lines, one from each sectional image, arranged adjacent to one another. Since the separate lines all contain images from a predetermined depth interval or plane, a view of this particular plane of the preselected layer is displayed on the frosted glass. That is to say, the partial images appear as strip-shaped representations on the translucent screen means 15, with the longer sides of these strip-shaped representations lying substantially adjacent one another on the screen means, these strip-shaped representations constituting reproductions of the partial images which are expanded in the direction parallel to the extension of the light source 12.

If it is desired to examine a different depth interval or layer, the diaphragm 13 is displaced by means 17 in the direction of the arrow A until the apertures 16 are aligned with the image lines corresponding to the desired plane. Thus, successive depth layers of the total region under investigation can be displayed.

Since the image displayed on frosted glass 15 is distorted as to scale, oblique viewing or the arrangement or the arrangement of a suitable optical system may be indicated.

The aspect during a displacement of diaphragm 13 is similar to the impression gained during the observation of a microtome section as the fine focusing adjustment of a microscope with large aperture is operated.

It is intended that all matter contained in the above description or shown in the accompanying drawing shall be interpreted as illustrative and not in a limiting sense.

What is claimed is:

A device for displaying stored images consisting of a plurality of relatively narrow, spaced-apart partial images, said device comprising, in combination:
(a) a collector lens;
(b) a linearly extended light source disposed in the focal plane of said collector lens;
(c) a diaphragm having a plurality of equi-spaced parallel slots corresponding in number and spacing to the number and spacing of said partial images, extending parallel to said partial images and perpendicular to the extension of said light source, said diaphragms lying adjacent the stored image to be displayed, on the side of the collector lens facing away from said light source, said diaphragm being substantially adjacent said collector lens; and
(d) translucent screen means between the diaphragm and an observer, so positioned that the partial images appear as strip-shaped representations on said translucent screen means, with the longer sides of said strip-shaped representations lying substantially adjacent one another on said screen means, said strip-shaped representations constituting reproductions of said partial images which are expanded in the direction parallel to the extension of said light source.

References Cited by the Examiner

UNITED STATES PATENTS

| | | |
|---|---|---|
| 1,260,682 | 3/18 | Kanolt. |
| 1,916,320 | 7/33 | Ives. |
| 2,663,217 | 12/53 | Tuttle et al. _____ 81—1 X |
| 2,689,502 | 9/54 | Ayres _____ 88—16.6 X |
| 3,082,560 | 3/63 | Elvestrom _____ 88—1 X |

JEWELL H. PEDERSEN, *Primary Examiner.*

UNITED STATES PATENT OFFICE
CERTIFICATE OF CORRECTION

Patent No. 3,198,060                        August 3, 1965

Manfred von Ardenne

It is hereby certified that error appears in the above numbered patent requiring correction and that the said Letters Patent should read as corrected below.

In the grant, lines 2 and 12, and in the heading to the printed specification, lines 5 and 6, for "Röntenwerk", each occurrence, read -- Röntgenwerk --; column 4, lines 23 and 24, for "diaphragms" read -- diaphragm --.

Signed and sealed this 18th day of January 1966.

(SEAL)
Attest:

ERNEST W. SWIDER                        EDWARD J. BRENNER
Attesting Officer                          Commissioner of Patents